(12) United States Patent
Clarkin

(10) Patent No.: US 6,546,174 B2
(45) Date of Patent: Apr. 8, 2003

(54) LONG LENGTH, SIDE-EMITTING FIBER OPTIC CABLES

(75) Inventor: James P. Clarkin, Scottsdale, AZ (US)

(73) Assignee: Polymicro Technologies, LLC., Phoenix, AZ (US)

( * ) Notice: Subject to any disclaimer, the term of this patent is extended or adjusted under 35 U.S.C. 154(b) by 0 days.

(21) Appl. No.: 09/756,104

(22) Filed: Jan. 9, 2001

(65) Prior Publication Data

US 2002/0090182 A1 Jul. 11, 2002

(51) Int. Cl.⁷ ................................................. G02B 6/44
(52) U.S. Cl. ........................ 385/100; 385/109; 362/559
(58) Field of Search .............................. 385/100, 99, 98, 385/95, 109, 901; 362/556, 559, 565, 576, 582

(56) References Cited

U.S. PATENT DOCUMENTS 5,333,227 A * 7/1994 Ishiharada et al. .......... 385/100
5,903,693 A * 5/1999 Brown ........................ 385/100
6,215,930 B1 * 4/2001 Estes et al. .................. 385/100

FOREIGN PATENT DOCUMENTS

WO    PCT WO 98/45645    * 10/1998    ............. F21V/8/00

* cited by examiner

Primary Examiner—Lynn D. Feild
Assistant Examiner—Hae Moon Hyeon
(74) Attorney, Agent, or Firm—Pillsbury Winthrop LLP

(57) ABSTRACT

An extended length side emitting cable is disclosed. The cable includes transmitting and side emitting fibers. As light proceeds along the side emitting fibers, it decreases in intensity and in color quality. The transmitting fibers are coupled into the side emitting fibers to refresh the light. In this manner the cable maintains increased uniformity of color and intensity along its length.

15 Claims, 3 Drawing Sheets

LONG LENGTH, SIDE-EMITTING FIBER OPTIC CABLES

BACKGROUND OF THE INVENTION

1. Field of the Invention

The present invention relates generally to fiber optic cables. More particularly, the present invention relates to extended length side-emitting fiber optic cables.

2. Background of the Invention

Side-emitting optical cables are available which can accept light from a point source and distribute it along a linear path for area illumination. One variation of side-emitting optical cables makes use of a series of notches in the optical fiber, each notch having a surface angled to the axis of the fiber. The angled surface reflects a portion of the light out of the fiber, making it available for use, either to be coupled into several output fibers, or more generally, into free space. Alternatively, an optical fiber may contain regions having differing indices of refraction so as to refract light out of a side of the optical fiber at various locations along the fiber's length. Another method makes use of reflective or refractive particles distributed throughout an optical fiber, causing scattering of light. The scattered light escapes through the side of the fiber.

Yet another method of providing side-emitting fibers is to make use of all-plastic fibers which have an outer jacket which allows transmission of light radiated continuously along the length of the fiber. This type of fiber is provided for markets such as landscaping, architecture and pool lighting, for example.

Since plastic fibers are flexible in comparison to silica fibers, they may be manufactured in larger diameters without increasing risk of damage from bending. Further, plastic fibers generally have a large numerical aperture (NA) compared to silica fibers. This combination makes plastic fibers well suited to use with large or diffuse light sources which might be difficult to couple into small, low NA silica fibers. Thus, plastic fibers are a good choice when working in area lighting applications which do not require the precision available with silica fibers.

Plastic fibers have two important limitations, however, when used in outdoor applications. The first is that they tend to have relatively high attenuation in the visible light spectrum, on the order of hundreds or thousands of dB/km, compared to available silica core fibers having attenuations below one dB/km. The second limitation results from a spectrum dependent transmittance. When white light is injected into a conventional plastic fiber, red light is absorbed at a greater rate than shorter wavelength blue light. Thus, as the light travels along the fiber the light becomes more and more blue, resulting in a blue tint to light emitted from the side of the fiber at points furthest from the light source. This has the obvious disadvantage that over long distances, side-emitting plastic fibers are not well suited to situations requiring a true color light source. These two limitations result in an effective length for an all-plastic illumination fiber of less than about 100 feet.

While silica core fibers are well adapted to providing long transmission distances, having low attenuation and good spectral performance, they are not well suited to use as side-emitting fibers and are thus, not presently a good choice for area lighting applications.

SUMMARY OF THE INVENTION

The present invention addresses the needs identified above by providing a hybrid optical fiber cable, which includes a first side-emitting illumination optical fiber and a second side-emitting illumination optical fiber. A first end of the second side-emitting illumination optical fiber is displaced longitudinally from a first end of the first side-emitting illumination optical fiber. A transmitting optical fiber is optically coupled to the first end of the second side-emitting illumination optical fiber to produce good spectral performance and long transmission distances in a fiber cable which provides side-emitted light.

In another embodiment, a strength member is disposed around the optical fibers and allows light emitted by the side-emitting illuminating optical fibers to pass therethrough.

In yet another embodiment, an outer jacket is disposed around the optical fibers and the strength member. As with the strength member, the outer jacket allows light emitted by the side-emitting illuminating optical fibers to pass therethrough.

In another embodiment, the first end of the second side-emitting optical fiber is displaced longitudinally from the first end of the first side-emitting optical fiber by a distance greater than about 25 feet.

In another embodiment of the present invention the first end of the second side-emitting optical fiber is displaced longitudinally from the first end of the first side-emitting optical fiber by a distance such that the optical fiber cable retains sufficient chromaticity to obtain a predetermined lighting effect.

In an alternate embodiment of the present invention, a light source is optically coupled into the first end of the first side-emitting illumination optical fiber and into the first low attenuation optical fiber and optically coupled via the first low attenuation optical fiber to the first end of the second side-emitting illumination optical fiber.

Another embodiment includes a third side-emitting illumination optical fiber. A first end of the third side-emitting fiber is displaced longitudinally from the first end of the first side-emitting illumination optical fiber and the first end of the second side-emitting illumination optical fiber. A second low attenuation optical fiber is optically coupled to the first end of the third side-emitting illumination optical fiber. This embodiment may further include a light source optically coupled into the first end of the first side-emitting illumination optical fiber and into the first and second low attenuation optical fibers and optically coupled via the first low attenuation optical fiber to the first end of the second side-emitting illumination optical fiber and via the second low attenuation optical fiber to the first end of the third side-emitting illumination optical fiber.

Additionally, the present invention may be embodied in an illumination device, including a first side-emitting illumination optical fiber having a first end optically coupled to a light source, a second side-emitting illumination optical fiber, a first end thereof displaced longitudinally from the first end of the first side-emitting illumination optical fiber, and a low attenuation optical fiber, a first end thereof optically coupled to the light source, a second end thereof optically coupled to the first end of the second side-emitting illumination optical fiber.

BRIEF DESCRIPTION OF THE DRAWINGS

The accompanying drawings, which are incorporated in and constitute a part of this specification illustrate an embodiment of the invention and together with the description, explains the objects, advantages, and principles of the invention.

DETAILED DESCRIPTION OF THE PREFERRED EMBODIMENTS

In the following description, for purposes of explanation and not limitation, specific details are set forth such as particular optical and electrical components, techniques, etc. in order to provide a thorough understanding of the present invention. However, the invention may be practiced in other embodiments that depart from these specific details. In some instances, detailed descriptions of well-known devices may be omitted so as not to obscure the description of the present invention with unnecessary details. Throughout the specification, where reference is made to a single fiber, a bundle of fibers may be understood as being equivalent.

Figure 1:
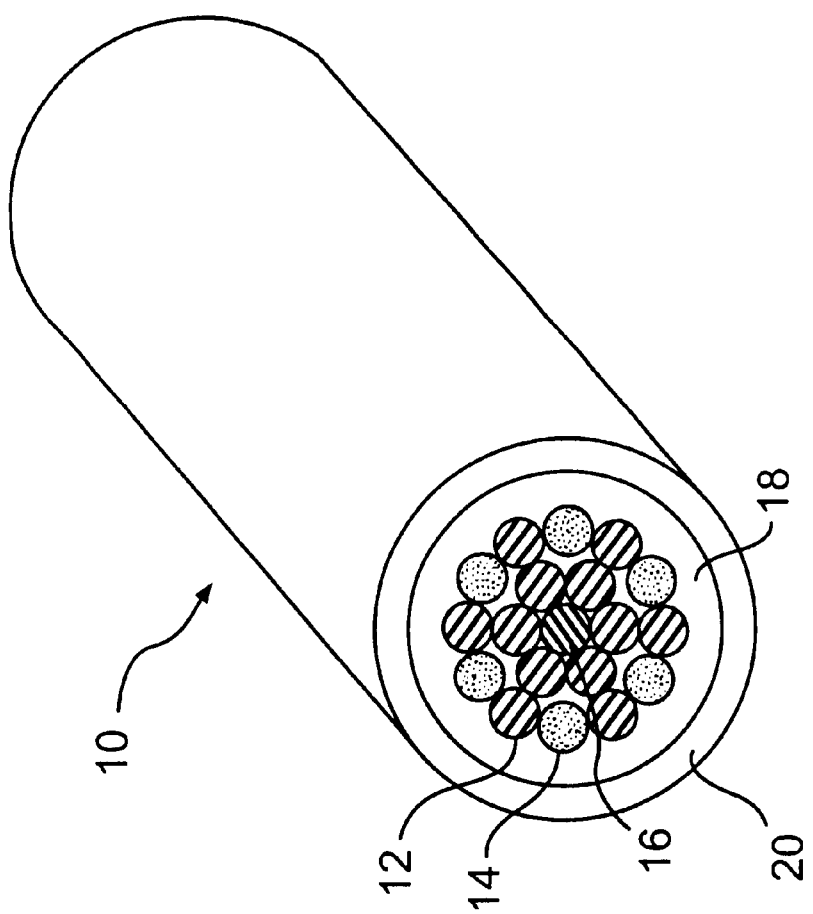
FIG. 1 shows a cross-section of an optical fiber cable according to an embodiment of the present invention.

Referring now to FIG. 1, an optical fiber cable 10 is shown. The optical fiber cable 10 contains several transmitting optical fibers 12. The transmitting optical fibers 12 are preferably low attenuation fibers and more specifically are preferably silica core fibers and may have a plastic or silica cladding. Included in the cable are several side-emitting optical fibers 14 which are preferably all-plastic fibers, though other side-emitting optical fibers may be used. A filler member 16 can be included to provide an improved packing arrangement and may be located in the center for the arrangement shown, or in another location if a different fiber arrangement is selected. The filler member 16 can additionally perform as a strengthening member and could be, for example, a steel wire.

Preferably, a strength member 18 surrounds the fibers, holding them in place and providing additional strength to the cable 10. The strength member 18 should be reasonably transparent or have holes or be otherwise configured so as to avoid blocking the light emitted from the side-emitting fibers 14. The strength member may advantageously be an aramid yarn, for example, though any appropriate material may be used. The cable 10 further has an outer jacket 20 which contains the fibers 12, 14, filler 16 and strength member 18. The outer jacket 20 should also allow light to pass through at least portions thereof. For example, the outer jacket 20 may be a transparent polyvinyl chloride (PVC) material. While for a continuous light source, the entire outer jacket 20 should be substantially transparent, alternately it could have opaque and transparent portions, providing light from discrete portions of the cable's length.

Figure 2:
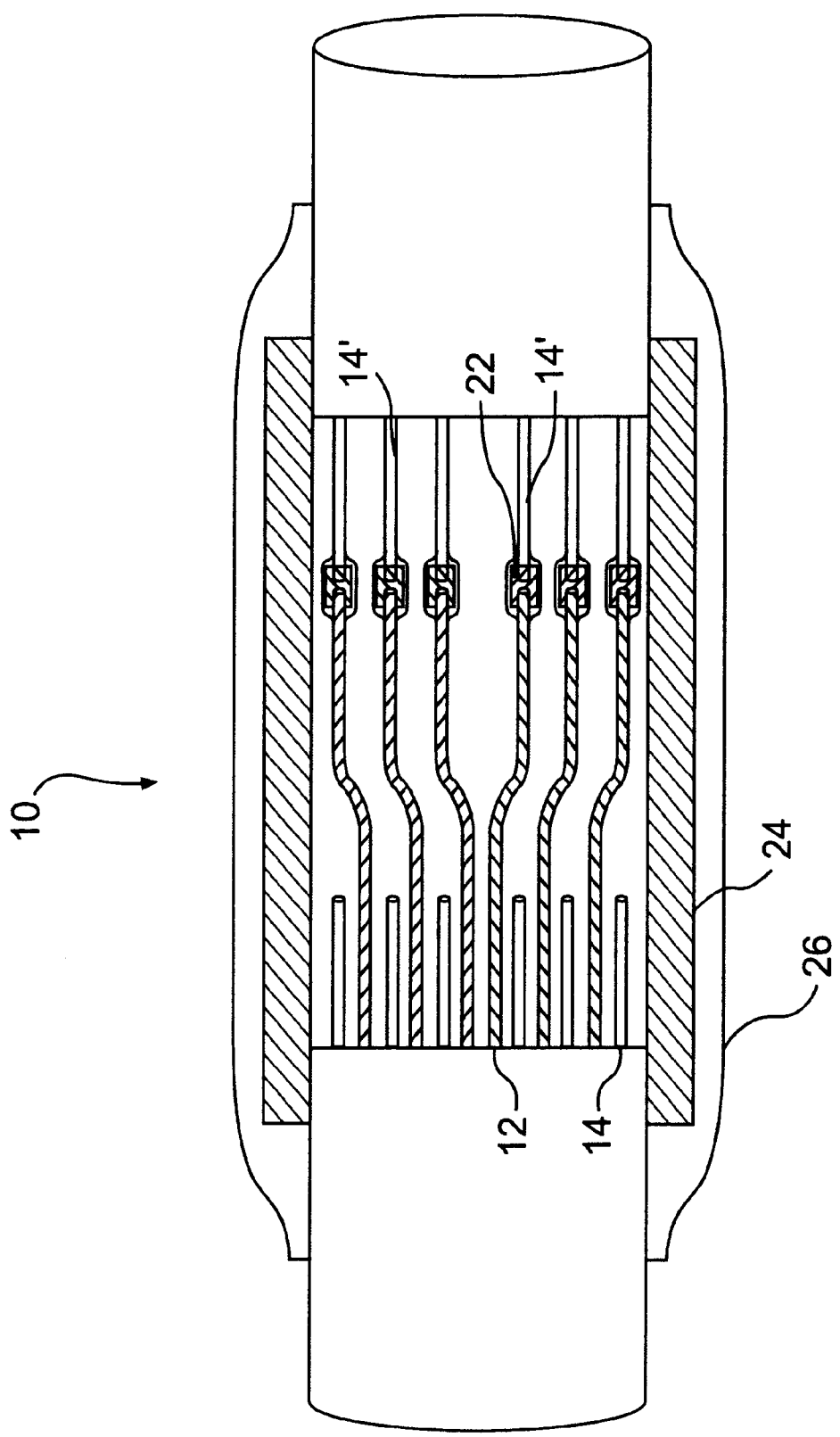
FIG. 2 is a schematic representation of an optical fiber cable according an embodiment of the present invention, showing cross connected transmitting and side-emitting fibers.

Referring now to FIG. 2, one embodiment of a cable 10 according to the present invention is shown. Several transmitting fibers 12, are placed alongside a first group of side-emitting fibers 14. One end of each of the transmitting fibers 12 is coupled with a splice or a coupler 22 to a member of a second group of side-emitting fibers 14'. Though the coupling shown is a one-to-one coupler, any suitable coupling or splice could be used. The second group of side-emitting fibers 14' extends further along the length of the cable 10. In FIG. 2, the coupling region is shown with a sleeve 24 provided to relieve strain. The sleeve 24 is further protected by a protective shrink wrap 26. The sleeve 24 may be steel, for example, and the shrink wrap 26 may be made from an appropriate plastic material. While the sleeve 24 and shrink wrap 26 are not necessary, they do improve the durability of the cable 10.

In operation, the cable 10 shown in FIG. 2 accepts light from a light source at the left, not shown. The light source may be any appropriate light source such as an LED, laser, light bulb, laser diode, etc. Light is injected into the side-emitting fibers 14 and the transmitting fibers 12. The light travels along the length of the fibers 12, 14 and is emitted from the sides of the side-emitting fibers. As the light travels further from the light source in the side-emitting fibers, it tends to change color due to wavelength dependent scattering and attenuation. Further, the overall power is attenuated. At a particular distance from the light source, the light traveling in the side-emitting fibers 14 will no longer be suitable for the selected application. For an area illumination application, this distance will typically be on the order of 25 to 100 feet. At, or preferably before, that distance, the transmitting fibers 12, which will have lost only a small fraction of their power, are coupled into a second group of side emitting fibers 14'. The second group of side-emitting fibers 14' transmit the light received from the transmitting fibers 12 and emit light from their sides over a distance similar to that provided by the first group of side emitting fibers 14. The length of each segment of fiber is preferably selected such that chromatic distortion and attenuation are not so great as to detract from the desired lighting effect. As may be understood, the particular application will define the allowable chromatic distortion and attenuation. In the case where an area, such as a landing pad, merely must be marked visibly, chromaticity will be relatively unimportant, and the attenuation will be of greater importance. In contrast, in an application such as architectural lighting, both chromaticity and attenuation are likely to be important in order to achieve a uniform effect.

Figure 3:
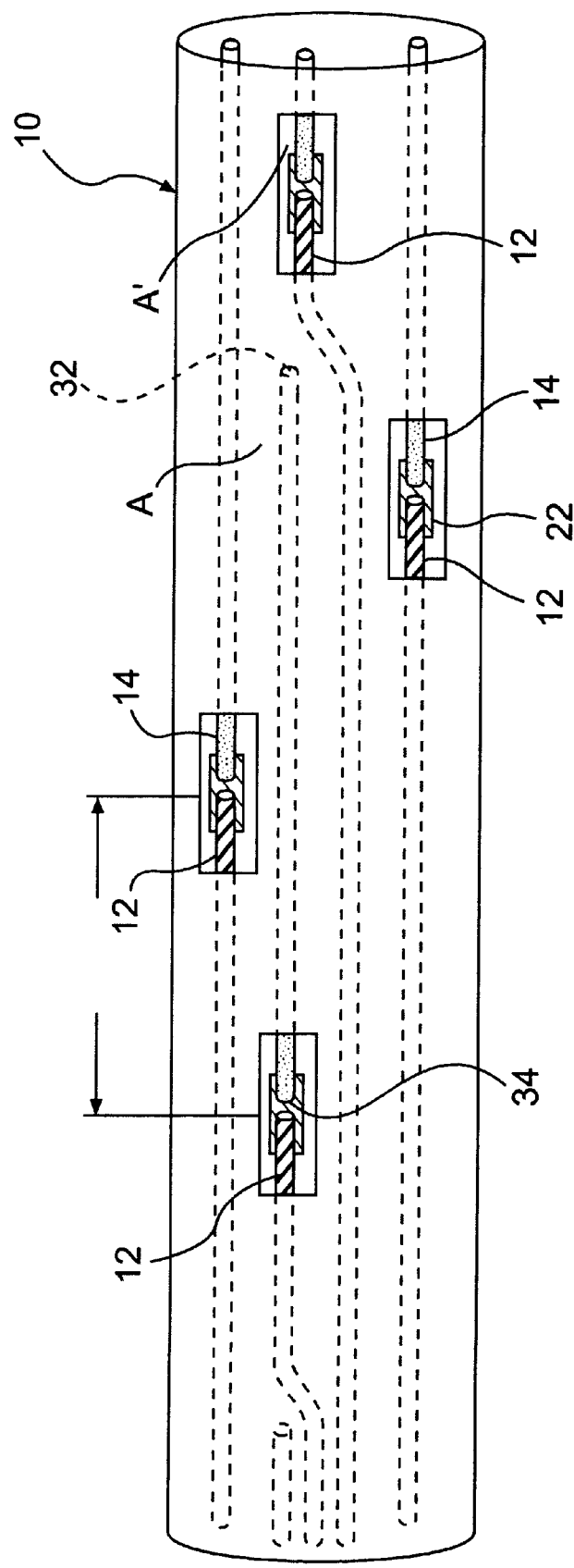
FIG. 3 is a schematic representation of an optical fiber cable according to an embodiment of the present invention, showing staggered coupling between transmitting and side-emitting fibers.

Referring now to FIG. 3, another coupling arrangement is shown. In this arrangement, several transmitting fibers 12 extend into the cable and each is coupled to a side-emitting fiber 14. The staggered coupling arrangement allows for greater uniformity of the light intensity emitted from the sides of the cable. In contrast to the embodiment illustrated in FIG. 2, there is not a single point along the length of the cable where light traveling in the side-emitting fibers 14 is refreshed, but rather many. Thus, any bright spots are distributed instead of concentrated at a single junction area.

FIG. 3 specifically shows three side-emitting illumination optical fibers 14, each having a first end thereof displaced longitudinally from one another. Two low attenuation optical fibers 12 are optically coupled to the first end of a second side-emitting illumination optical fiber 14 and to a first end of a third side-emitting illumination optical fiber 14, respectively.

In FIG. 1 as shown, there are six side-emitting fibers 14 and twelve transmitting fibers 12 along with a single filler member 16. This arrangement could be used, for example, to triple the possible effective cable length. As light proceeds along the length of the cable 10 and the first six side-emitting optical fibers 14 begin to suffer from attenuation, six of the transmitting optical fibers 12 are coupled into the side-emitting optical fibers 14 or into ends of a second group of side-emitting optical fibers (not shown). Proceeding further along the length of the cable 10, the side-emitted signal again begins to decay and a second coupling using the remaining six transmitting fibers 12 refreshes the side-emitted signal once more. By mirroring this arrangement and providing a light source at either end of the cable 10, a cable having a length six times longer than a non-hybrid cable may be manufactured while maintaining light quality and intensity.

The 19 fiber arrangement also makes use of the fact that 19 fibers (18 light guiding fibers and one strength member) can be close-packed across the face of the cable. Likewise seven fibers may be close packed, a hexagon of fibers packed around a single strength member. In a seven fiber cable, four light transmitting fibers could be used alongside two side-emitting fibers to produce a hybrid cable three times as long as a conventional side-emitting cable.

As is apparent, many other arrangements are possible. By way of example, in a 19 fiber cable, three fibers may be side-emitting while 15 are transmitting fibers. At each junction, three of the transmitting fibers may be coupled to three side-emitting fibers, allowing five extensions, and a cable six times as long as a conventional side-emitting cable. Again, by mirroring the cable and providing a second light source, a cable twice again as long (twelve times as long as a conventional cable) may be produced. One skilled in the art may recognize many alternate arrangements.

While the invention has been described in connection with what is presently considered to be the most practical and preferred embodiment, it is to be understood that the invention is not limited to the disclosed embodiment, but on the contrary it is intended to cover various modifications and equivalent arrangements included within the spirit and scope of the claims which follow.

What is claimed is:

1. A hybrid optical fiber cable, comprising:
   a first side-emitting illumination optical fiber;
   a second side-emitting illumination optical fiber, a first end thereof displaced longitudinally from a first end of the first side-emitting illumination optical fiber by a distance such that the optical fiber cable retains sufficient chromaticity to obtain a predetermined lighting effect; and
   a first low attenuation optical fiber, optically coupled to the first end of the second side-emitting illumination optical fiber.

2. A cable as in claim 1, further comprising:
   a strength member, disposed around the optical fibers, the strength member allowing light emitted by the side-emitting illuminating optical fibers to pass therethrough.

3. A cable as in claim 2, further comprising:
   an outer jacket, disposed around the optical fibers and the strength member, the outer jacket allowing light emitted by the side-emitting illuminating optical fibers to pass therethrough.

4. A cable as in claim 1, wherein the first end of the second side-emitting optical fiber is displaced longitudinally from the first end of the first side-emitting optical fiber by a distance greater than about 25 feet.

5. A cable as in claim 1, further comprising a light source, optically coupled into a second end of the first side-emitting illumination optical fiber and into the first low attenuation optical fiber and optically coupled via the first low attenuation optical fiber to the first end of the second side-emitting illumination optical fiber.

6. A cable as in claim 1, further comprising
   a third side-emitting illumination optical fiber, a first end thereof displaced longitudinally from the first end of the first side-emitting illumination optical fiber and the first end of the second side-emitting illumination optical fiber; and
   a second low attenuation optical fiber, optically coupled to the first end of the third side-emitting illumination optical fiber.

7. A cable as in claim 6, further comprising a light source, optically coupled into the first end of the first side-emitting illumination optical fiber and into the first and second low attenuation optical fibers and optically coupled via the first low attenuation optical fiber to the first end of the second side-emitting illumination optical fiber and via the second low attenuation optical fiber to the first end of the third side-emitting illumination optical fiber.

8. An illumination device, comprising:
   a first side-emitting illumination optical fiber having a first end optically coupled to a light source;
   a second side-emitting illumination optical fiber, a first end thereof displaced longitudinally from a second end of the first side-emitting illumination optical fiber by a distance such tat the illumination device retains sufficient chromaticity to obtain a predetermined lighting effect; and
   a low attenuation optical fiber, a first end thereof optically coupled to the light source, a second end thereof optically coupled to the first end of the second side-emitting illumination optical fiber.

9. A hybrid optical fiber cable, comprising:
   a first side-emitting illumination optical fiber;
   a second side-emitting illumination optical fiber, a first end thereof displaced longitudinally from a second end of the first side-emitting illumination optical fiber such that the optical fiber cable retains at least one of uniform intensity and uniform chromaticity to obtain a predetermined lighting effect; and
   a low attenuation optical fiber optically coupled to the first end of the second side-emitting illumination optical fiber.

10. A cable as in claim 9, further comprising:
    a strength member, disposed around the optical fibers, the strength member allowing light emitted by the side-emitting illuminating optical fibers to pass therethrough.

11. A cable as in claim 10, further comprising:
    an outer jacket, disposed around the optical fibers and the strength member, the outer jacket allowing light emitted by the side-emitting illuminating optical fibers to pass therethrough.

12. A cable as in claim 9, wherein the first end of the second side-emitting optical fiber is displaced longitudinally from the first end of the first side- emitting optical fiber by a distance greater than about 25 feet.

13. A cable as in claim 9, further comprising a light source, optically coupled into a second end of the first side-emitting illumination optical fiber and into the first low attenuation optical fiber and optically coupled via the first low attenuation optical fiber to the first end of the second side-emitting illumination optical fiber.

14. A cable as in claim 9, further comprising
    a third side-emitting illumination optical fiber, a first end thereof displaced longitudinally from the first end of the first side-emitting illumination optical fiber and the first end of the second side-emitting illumination optical fiber; and
    a second low attenuation optical fiber, optically coupled to the first end of the third side-emitting illumination optical fiber.

15. A cable as in claim 14, further comprising a light source, optically coupled into the first end of the first side-emitting illumination optical fiber and into the first and second low attenuation optical fibers and optically coupled via the first low attenuation optical fiber to the first end of the second side-emitting illumination optical fiber and via the second low attenuation optical fiber to the first end of the third side-emitting illumination optical fiber.

* * * * *